UNITED STATES PATENT OFFICE.

WILLIAM GIBSON, OF NEW YORK, N. Y.

IMPROVEMENT IN CRYSTALLINE GLASS.

Specification forming part of Letters Patent No. 212,682, dated February 25, 1879; application filed November 26, 1878.

*To all whom it may concern:*

Be it known that I, WILLIAM GIBSON, of New York, in the county of New York and State of New York, have invented certain new and useful Improvements in Crystalline Glass; and I do hereby declare that the following is a full, clear, and exact description thereof.

The nature of my invention consists in crystalline glass, as an article of manufacture, prepared from ordinary or not ground glass, as will be hereinafter more fully set forth.

In the manufacture of this glass I use a compound of ordinary flint or lead glass, silicious sand, litharge in scales, and calcined bones, which, when properly melted, forms the vehicle or flux by which the desired effects are produced. A part of this mixture is then combined with calcined flint-powder, and the whole ground in water to the necessary fineness, and milk added as a binder till it forms a pasty mass, with which the glass is coated. It is then vitrified in the muffle or furnace in the usual manner. The sheets of glass thus coated are then heated, when the whole is coated with a suitable non-elastic paste, which is allowed to harden, and then removed by heat.

When it is desired to produce the crystalline effect on parts of the glass only, I use with the first compound some suitable oxide and gum-water instead of milk, and coat therewith certain parts of the glass, and then proceed as before, when there will be clear glass and crystalline on the same glass. The portions left of the glass may have any desired tint, and it becomes a great aid in giving a texture to the artist in his after finish of leaves, vines, draperies, &c.

Glass having a stippled or granulated effect is produced by coating in the same manner without heating the glass just where this effect is desired, and while still wet it is placed in an oven and dried quickly.

Glass having large flakes or fern-leaves is made by placing thereon real leaves, forms cut in paper, lace, or other articles, and then coating with the mixture, which is allowed to harden and then removed by heat. Colors, silver, gold, &c., may be added for mural decorations, panelings, &c.; and one sheet may contain all the various effects where defined spaces are controlled by design and outline.

By embedding pieces of paper in the mass of adhesive matter the glass obtains a stony gem appearance.

By adding glycerine and clay whiting or similar material to the mixture, and embedding paper or muslin in the mass, the prism-flakes assume a great size and brilliancy, which is valuable to the glass-stainers as a new surface for picture effects.

When shells, worms, insects, &c., are desired along with the vegetation, the adhesive mixture is put on with a brush or syringe, forming convolutions or spiral lines of different thickness.

I also produce glass with double crystalline surface, and backed with colors for architectural and other purposes. It may also be backed up with gold, silver, lacquers, foils, pearl, and other matters when the glass is to be used in decoration to imitate marbles, mosaics, and gems.

This glass may also be used for brilliant reflecting purposes, but is more especially intended for the use of glass-stainers and in the fabrication of glass pictures, &c., as well as all purposes of decoration.

In this application I make no claim to the compound or the process of manufacturing, as I have made a separate application of even date herewith for the same.

Having thus fully described my invention, what I claim as new, and desire to secure by Letters Patent, is—

As a new article of manufacture, crystallized glass having the effect herein described, when produced substantially by the means set forth.

In testimony that I claim the foregoing as my own I affix my signature in presence of two witnesses.

WILLIAM GIBSON.

Witnesses:
 SPENCER C. DOTY,
 WALTER W. GIBSON.